United States Patent
Ganiger et al.

(10) Patent No.: US 11,608,747 B2
(45) Date of Patent: Mar. 21, 2023

(54) SPLIT SHROUD FOR VIBRATION REDUCTION

(71) Applicant: General Electric Company, Schenectady, NY (US)

(72) Inventors: Ravindra Shankar Ganiger, Bengaluru (IN); Sam J. Stoughton, West Chester, OH (US); Kevin Lee Kirkeng, Milford, OH (US); Jacob P. Miller, West Chester, OH (US); Reddi Hari Prasad Reddy Mylapalli, Bengaluru (IN); Paul Trimby, Lynn, MA (US); Jaeyong Kim, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/143,855

(22) Filed: Jan. 7, 2021

(65) Prior Publication Data
US 2022/0213795 A1 Jul. 7, 2022

(51) Int. Cl.
| F01D 5/22 | (2006.01) |
| F02C 7/28 | (2006.01) |
| F01D 25/04 | (2006.01) |
| F01D 5/16 | (2006.01) |
| F01D 25/06 | (2006.01) |
| F01D 5/26 | (2006.01) |
| F01D 17/16 | (2006.01) |
| F04D 29/66 | (2006.01) |
| F01D 11/00 | (2006.01) |
| F04D 29/56 | (2006.01) |

(52) U.S. Cl.
CPC .............. *F01D 5/225* (2013.01); *F01D 5/16* (2013.01); *F01D 5/26* (2013.01); *F01D 17/162* (2013.01); *F01D 25/04* (2013.01); *F01D 25/06* (2013.01); *F02C 7/28* (2013.01); *F04D 29/666* (2013.01); *F04D 29/668* (2013.01); *F01D 11/001* (2013.01); *F04D 29/563* (2013.01); *F05D 2240/11* (2013.01); *F05D 2240/55* (2013.01); *F05D 2260/31* (2013.01); *F05D 2260/961* (2013.01)

(58) Field of Classification Search
CPC ........ F01D 17/162; F01D 25/04; F01D 25/06; F01D 5/16; F01D 5/225; F01D 5/26; F01D 11/001; F04D 29/563; F04D 29/668; F04D 29/666; F04D 29/164; F05D 2260/96; F05D 2260/961; F05D 2240/11; F05D 2240/55
See application file for complete search history.

(56) References Cited

U.S. PATENT DOCUMENTS 3,269,701 A * 8/1966 Miller ...................... F01D 9/042
415/209.4
3,314,654 A * 4/1967 Thenault et al. ..... F01D 17/162
415/160
3,455,268 A 7/1969 Gordon
(Continued)

*Primary Examiner* — Christopher Verdier
(74) *Attorney, Agent, or Firm* — Hanley, Flight & Zimmerman, LLC

(57) ABSTRACT

Methods, apparatus, systems and articles of manufacture are disclosed. A split shroud for an inner shroud of a gas turbine engine includes: at least one forward shroud segment and at least one aft shroud segment to couple to the at least one forward shroud segment, the at least one forward shroud segment and the at least one aft shroud segment forming a split line.

15 Claims, 4 Drawing Sheets

(56) References Cited

U.S. PATENT DOCUMENTS

| | | | |
|---|---|---|---|
| 4,768,922 A | | 9/1988 | Kozak et al. |
| 5,277,544 A | | 1/1994 | Naudet |
| 5,421,703 A | * | 6/1995 | Payling .................. F01D 9/042 |
| | | | 415/209.3 |
| 6,413,043 B1 | * | 7/2002 | Bouyer ................. F01D 17/162 |
| | | | 29/451 |
| 6,790,000 B2 | | 9/2004 | Wolf |
| 7,654,797 B2 | | 2/2010 | Boegli et al. |
| 7,713,022 B2 | | 5/2010 | Major et al. |
| 8,087,881 B1 | | 1/2012 | Cardoso, III et al. |
| 9,334,751 B2 | | 5/2016 | Dube et al. |
| 9,410,443 B2 | | 8/2016 | Dube et al. |
| 9,777,594 B2 | | 10/2017 | Lang |
| 9,903,218 B2 | | 2/2018 | Hafner et al. |
| 10,107,122 B2 | | 10/2018 | Maliniak |
| 10,107,125 B2 | | 10/2018 | Rioux |
| 2008/0112809 A1 | * | 5/2008 | Corral Garcia ........... F01D 5/10 |
| | | | 416/189 |
| 2009/0097966 A1 | * | 4/2009 | McCaffrey ............ F01D 17/162 |
| | | | 415/130 |
| 2010/0232936 A1 | * | 9/2010 | Mielke ................. F01D 17/162 |
| | | | 415/160 |
| 2011/0176913 A1 | * | 7/2011 | Wassynger ................ F02C 6/12 |
| | | | 415/159 |
| 2014/0140822 A1 | | 5/2014 | Capozzi et al. |
| 2015/0098802 A1 | | 4/2015 | Farineau et al. |
| 2015/0354387 A1 | * | 12/2015 | Maliniak ............... F01D 11/005 |
| | | | 415/1 |
| 2016/0341068 A1 | | 11/2016 | Robertson, Jr. et al. |
| 2017/0268370 A1 | * | 9/2017 | McCaffrey ............. F01D 11/08 |
| 2018/0112555 A1 | | 4/2018 | Humhauser |
| 2019/0032497 A1 | | 1/2019 | Puram et al. |
| 2020/0056494 A1 | * | 2/2020 | Delahaye ............. F04D 29/563 |

\* cited by examiner

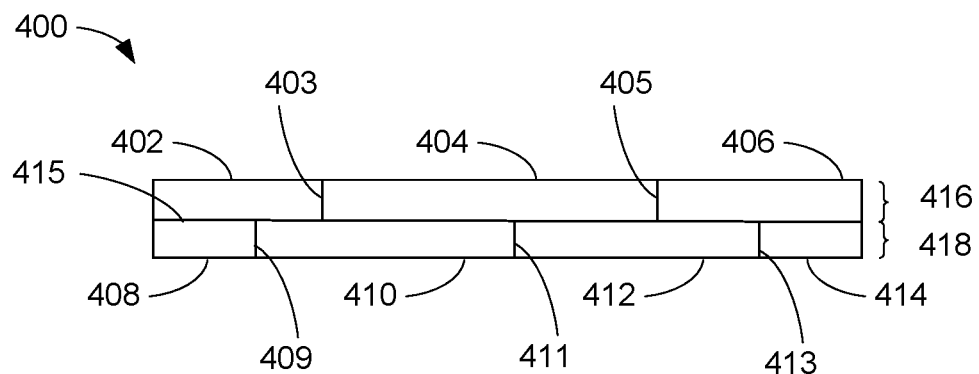
FIG. 4A
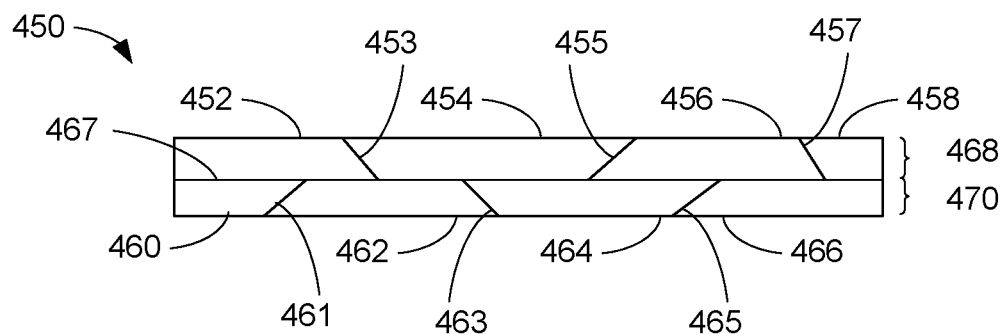
FIG. 4B
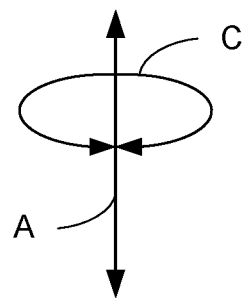

SPLIT SHROUD FOR VIBRATION REDUCTION

FIELD OF THE DISCLOSURE

This disclosure relates generally to gas turbines, and, more particularly, to a split shroud for vibration reduction.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

BRIEF SUMMARY

Methods, apparatus, systems, and articles of manufacture to reduce turbine engine vibration are disclosed.

Certain examples provide an apparatus including at least one forward shroud segment and at least one aft shroud segment to couple to the at least one forward shroud segment, the at least one forward shroud segment and the at least one aft shroud segment forming a split line.

Certain examples provide a gas turbine engine including a split shroud damper including at least one forward shroud segment and at least one aft shroud segment to couple to the at least one forward shroud segment, the at least one forward shroud segment and the at least one aft shroud segment forming a split line, and a seal box coupled to the at least one forward shroud segment and the at least one aft shroud segment.

Certain examples provide an apparatus including first means for mis-tuning and/or damping component vibration and second means for mis-tuning and/or damping component vibration, the second means for mis-tuning and/or damping component vibration coupled to the first means for mis-tuning and/or damping component vibration.

BRIEF DESCRIPTION OF THE DRAWINGS

FIG. 4A illustrates an example top view of a second example split shroud damper.

FIG. 4B illustrates an example top view of a third example split shroud damper.

Figure 1:
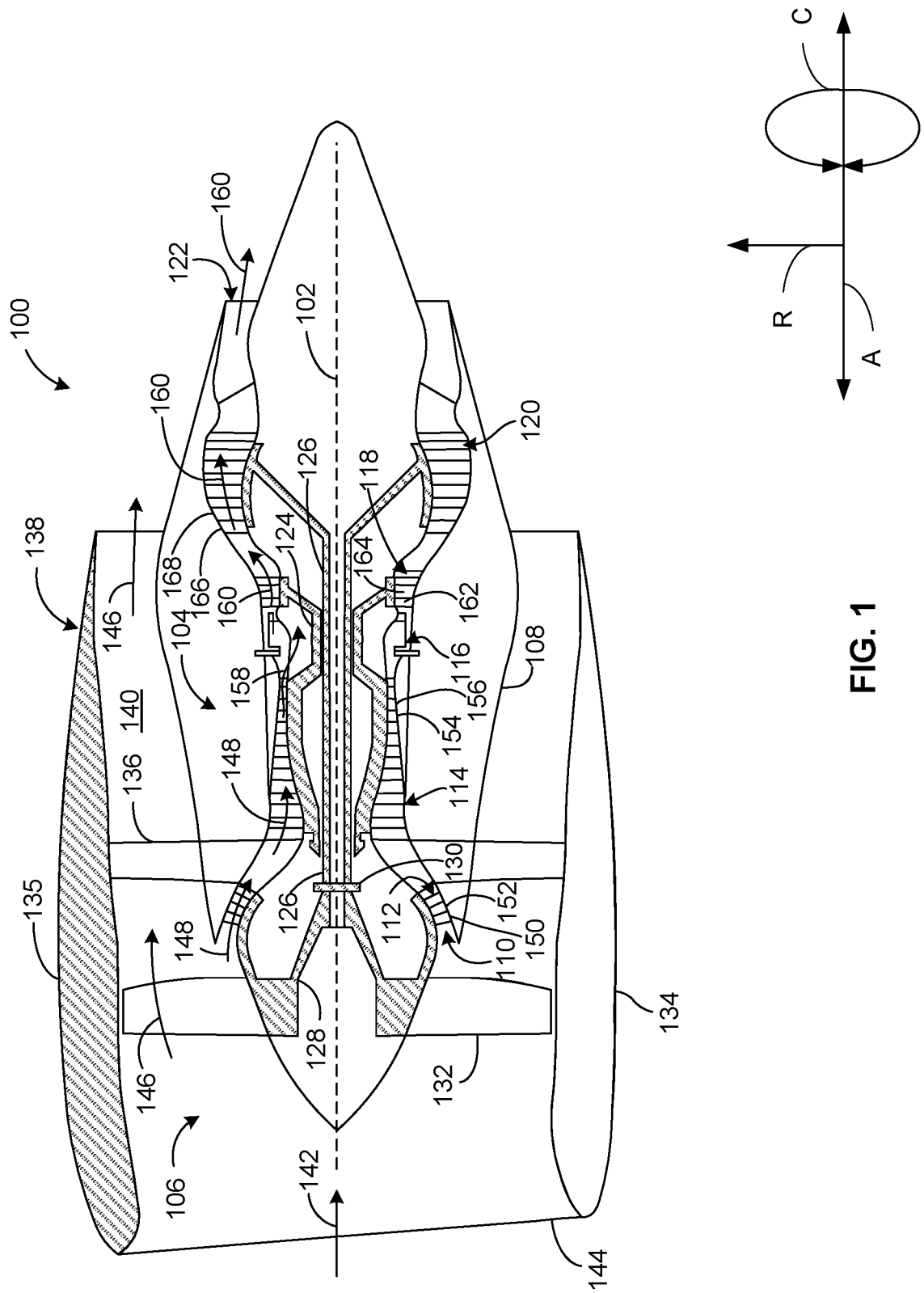
FIG. 1 illustrates an example gas turbine engine.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Engine and component vibration occurs during normal engine operation. For example, forces acting on one or more airfoils (e.g., vanes, blades, etc.) during operation of the engine can cause the one or more airfoils to vibrate an undesirable amount, introducing stress, and eventual wear, on the one or more airfoils. Component vibration mode responses to the engine vibration or other sources include airfoil mode response (e.g., one airfoil is vibrating), soldier mode response (e.g., one or more airfoils attached to the shroud are vibrating together), etc. The vibration mode responses cause eventual wear on the airfoils (e.g., trunnion cracking, trunnion locking, etc.). There is a continuing need to reduce the vibration response of the component. Certain examples provide a split shroud damper that increases damping (e.g., frictional damping) between split connections, improving durability of the one or more airfoils and associated engines.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an example implementation and not to be taken limiting on the scope of the subject matter described in this disclosure. Certain features from different aspects of the following description may be combined to form yet new aspects of the subject matter discussed below.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the gas turbine engine 100. As used herein, "lateral" refers to the direction perpendicular to the axial vertical directions (e.g., into and out of the plane of FIGS. 1, 2, etc.).

Various terms are used herein to describe the orientation of features. As used herein, the orientation of features, forces and moments are described with reference to the axial direction, radial direction, and circumferential direction of the vehicle associated with the features, forces and moments. In general, the attached figures are annotated with a set of axes including the axial axis A, the radial axis R, and the circumferential axis C.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Gas turbine engines include rows of vanes, rows of rotor blades, etc. In some examples, the vanes of gas turbine engines are variable stator vanes ("VSV") which allow individual stator vanes to rotate about their respective axes (e.g., the radial axis). In some prior designs, VSV and shroud assemblies include one 360 degree segment, two 180 degree segments, or other number of segments, which form a single row of stators associated with a particular stage of the compressor. While examples disclosed herein are described with reference to stators in the compressor, the examples disclosed herein can be applied to stators in any section of the gas turbine engine.

In some examples, the rotation of the VSVs is controlled by trunnions disposed within the shroud and/or a seal box beneath the shroud and VSV. As used herein, a "trunnion" is a part and/or feature that permits a rotation of a part and/or feature support thereon and/or thereby. In some prior techniques, testing has shown that the trunnions can have unfavorable cracking and fatigue depending on the vibration response mode (e.g., a soldier mode response, etc.). The vibration response during engine operation is based at least in part on conflicting design parameters of the VSVs (e.g., stiffness, durability, etc.) in view of the shroud end mass. Such responses can cause the trunnions to lock (e.g., stop rotating) within the seal box, which decreases engine performance and fatigues the VSV. For example, during particular vibration responses, the cylindrical shape of the trunnion may deform in a manner that causes three points of the trunnion to contact the shroud, which prevents the trunnion from rotating, thereby locking the VSV. Additionally, trunnion locking can cause fatigue and cracking in the cylindrical trunnion.

Examples disclosed herein can reduce undesired effects caused by these distortions in the engine based on a reduction of engine vibration. By segmenting the inner shroud of the gas turbine engine to form a split shroud damper, for example, the vibration response is mitigated. The split shroud damper can include one or more shroud segments connected via bolted joints.

Reference now will be made in detail to examples of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one example can be used with another example to yield a still further example. Thus, it is intended that the present invention covers such modifications and variations as come within the scope of the appended claims and their equivalents.

FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine or gas turbine engine 104 disposed downstream from a fan section 106.

The core turbine 104 generally includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106. In some examples, the LP shaft 126 may couple directly to the fan shaft 128 (i.e., a direct-drive configuration). In alternative configurations, the LP shaft 126 may couple to the fan shaft 128 via a reduction gear 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass flow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106.

Figure 2:
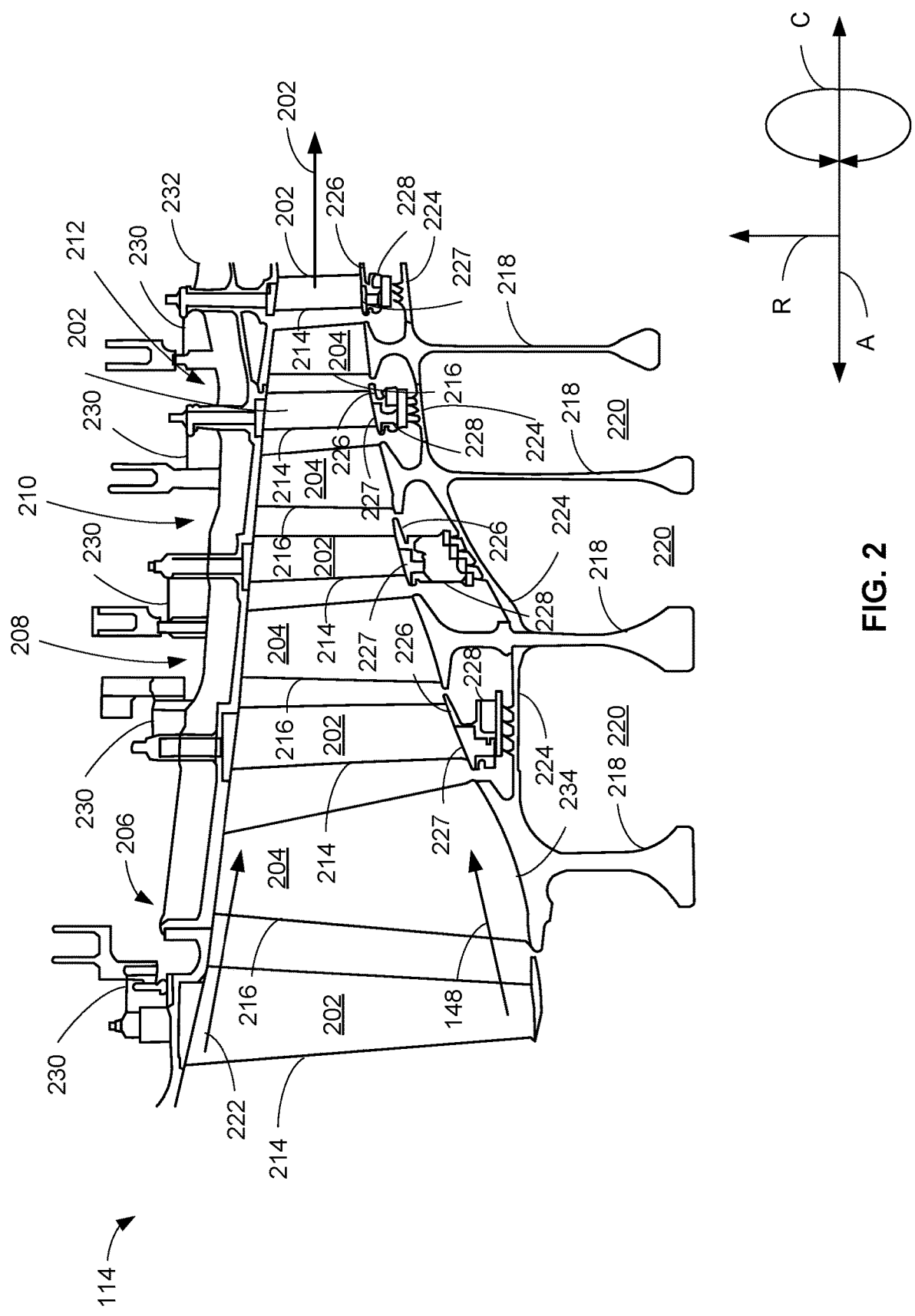
FIG. 2 illustrates an example cross-sectional side view of the high pressure compressor of the turbofan shown in FIG. 1.

FIG. 2 illustrates an example cross-sectional side view of the HP compressor 114 of the turbofan 100 shown in FIG. 1. The HP compressor 114 includes one or more sequential stages. The illustrated example of FIG. 2 includes a first stage 206, a second stage 208 positioned axially downstream from the first stage 206, a third stage 210 positioned axially downstream from the second stage 208, and a fourth stage 212 positioned axially downstream from the third stage 210. Although, the HP compressor 114 can include more or less stages as is necessary or desired.

Each of the stages 206, 208, 210, 212 include a row 214 of the stator vanes 202 and a row 216 of the rotor blades 204. The stator vanes 202 in the row 214 are circumferentially spaced apart. In examples disclosed herein, the stator vanes 202 are variable stator vanes ("VSVs 202"), which can be coupled to one or more synchronization rings or brackets, for example. The synchronization rings or brackets are coupled to an actuator to at least partially rotate the VSVs 202 about the radial axis. For example, the VSVs 202 are coupled to a VSV lever arm 230. In examples disclosed herein, the VSVs 202 can rotate about an axis in the radial direction R to mitigate compressor stall or surge. Each of the VSVs 202 includes a trunnion 227 to couple with a corresponding inner shroud 226. In the illustrated example of FIG. 2, the trunnion 227 is disposed radially inward from the engine case 232. In the illustrated example of FIG. 2, the inner shroud 226 is coupled to a seal box 228.

Similarly, the rotor blades 204 in the row 216 are also circumferentially spaced apart. In the example shown in FIG. 2, the row 216 of rotor blades 204 is positioned axially downstream from the row 214 of stator vanes 202. Each of the rotor blades 204 includes a connection portion 234 (not labeled with respect to the rotor blades 204 of the stages 208, 210, 212) extending radially inward from the engine case 232 for coupling with a corresponding rotor disc 218. The connection portion can include an axial dovetail, a circumferential dovetail, a fir tree, or other connection portion shape.

The rows 214 of the stator vanes 202 and the rows 216 of the rotor blades 204 of each of the stages 206, 208, 210, 212 collectively define a compressed gas path 222 through which the second portion 148 of the air 142 flows. In particular, the stator vanes 202 direct the second portion 222 of the air 142 onto the rotor blades 204, which impart kinetic energy into the second portion 148 of the air 142. In this respect, the rotor blades 204 convert the second portion 148 of the air 142 flowing through the HP compressor 114 into the compressed air 158. Outlet guide vanes, if included, direct the flow of compressed air 158 into the combustion section 116.

A coupling, such as a labyrinth seal 224, is positioned between each adjacent pair of rotor discs 218. In the example shown in FIG. 2, for example, a first labyrinth seal 224 is positioned between the rotor discs 218 of the first and the second stages 206, 208. A second labyrinth seal 224 is positioned between the rotor discs 218 of the second and the third stages 208, 210. A third labyrinth seal 224 is positioned between the rotor discs 218 of the third and the fourth stages 210, 212. A fourth labyrinth seal 224 is positioned axially downstream of the rotor discs 218 of the fourth stage 212. The labyrinth seals 224 prevent interstage leakage of the second portion 148 of the air 142 across the compressor stages 206, 208, 210, 212. Furthermore, the labyrinth seals 224 permit relative rotation between each of the rows 214 of stator vanes 202 and the adjacent rotor discs 218. This allows the rotor blades 204 to rotate, while the stator vanes 202 remain stationary. In other examples, the coupling may be a brush seal (not shown) or any type of suitable seal. In this respect, all of the rotor discs 218 rotate in unison when the HP turbine 118 drives the HP shaft 124. Furthermore, each of the labyrinth seals 224 in combination with each corresponding adjacent pair of rotor discs 218 coupled thereby define a rotor disc space 220.

Figure 3:
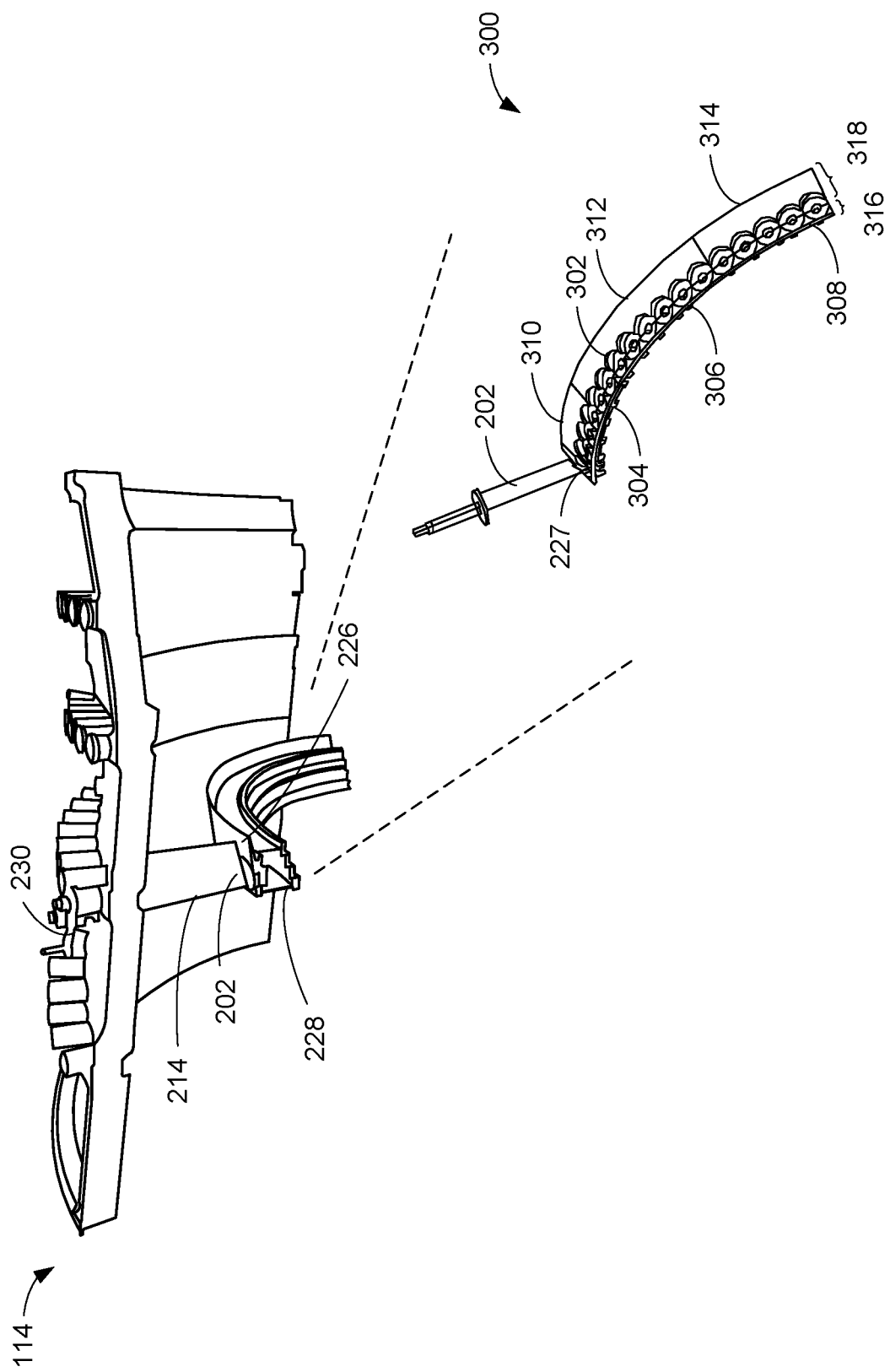
FIG. 3 illustrates an example perspective view of a first example split shroud damper.

FIG. 3 illustrates an example perspective view of a first example split shroud 300. The illustrated example of FIG. 3 includes a perspective view of the cross-sectional side view of the HP compressor 114 shown in FIGS. 1 and 2. The HP compressor 114 includes a VSV 202 of the row 214 of the second stage 208. However, the rows 214 of the stages 206, 210, 212 can additionally or alternatively be included. While only one VSV 202 is illustrated in FIG. 3, it is to be understood that one or more VSVs 202 can be included. The HP compressor 114 includes the inner shroud 226 implemented by the split shroud 300 coupled to the seal box 228.

The split shroud 300 includes a VSV 202 coupled to the split shroud 300 via the trunnion 227. That is, the trunnion 227 interfaces with the opening 302 in the split shroud 300. In the illustrated example of FIG. 3, the split shroud 300 includes 16 of the openings 302 (e.g., corresponding to 16 of the VSVs 202 (not illustrated)). The split shroud 300 includes a first forward shroud segment 304, a second forward shroud segment 306, and a third forward shroud segment 308. The split shroud 300 further includes a first aft shroud segment 310, a second aft shroud segment 312, and a third aft shroud segment 314. That is, the aft shroud segments 310, 312, 314 are positioned axially downstream from the forward shroud segments 304, 306, 308. The shroud segments 304, 306, 308, 310, 312, 314 can be any material suitable for the environment and compatible with the shroud and damping systems. In some examples, the shroud segments 304, 306, 308, 310, 312, 314 are steel. However, the shroud segments 304, 306, 308, 310, 312, 314 can additionally or alternatively be alloys of titanium, iron, or nickel with adequate strength, fatigue tolerance, and/or other material characteristics, etc. for vibration damping.

In examples disclosed herein, the shroud segments 304, 306, 308, 310, 312, 314 of the split shroud 300 provide mass damping and mis-tuning behavior during engine operation. That is, mis-tuning of the shroud segments 304, 306, 308, 310, 312, 314 can contribute to damping and/or reducing component vibration. For example, the shroud segments 304, 306, 308, 310, 312, 314 act anti-mode to certain vibration responses. That is, the VSVs 202 vibrate at a first frequency during normal engine operation based on the design parameters of the VSVs 202 (e.g., durability, stiffness, etc.). The shroud segments 304, 306, 308, 310, 312, 314 can be tuned (e.g., designed to have a certain durability, stiffness, weight, etc.) to vibrate at a second frequency during normal engine operation such that the second frequency interferes with the first frequency. That is, the shroud segments 304, 306, 308, 310, 312, 314 can be tuned to act anti-mode to the vibration of the gas turbine engine 100. Thus, the shroud segments 304, 306, 308, 310, 312, 314 provide vibration reduction from damping, damping from mis-tuning, or mis-tuning alone.

For example, the gas turbine engine 100 may vibrate at a first frequency of 10 Hz. The shroud segments 304, 306, 308, 310, 312, 314 can be tuned to vibrate at a second frequency that is non-integral to the system response, such as 13 Hz or 14 Hz. The vibration of the shroud segments 304, 306, 308, 310, 312, 314 interferes with the vibration of the VSVs 202, and, thus, dampens the vibration of the VSVs 202 and reduces trunnion cracking. In some examples, the shroud segments 304, 306, 308, 310, 312, 314 are tuned to vibrate at the same frequency. Additionally or alternatively, the shroud segments 304, 306, 308, 310, 312, 314 are tuned to vibrate at different frequencies. At least the forward shroud segments 304, 306, 308 can be used to implement a first means for mis-tuning and damping component vibration. At least the aft shroud segments 310, 312, 314 can be used to implement a second means for mis-tuning and damping component vibration.

In the illustrated example, the shroud segments 304, 306, 308, 310, 312, 314 are coupled via pins. However, the shroud segments 304, 306, 308, 310, 312, 314 can be coupled via bolts, screws, etc. For example, the first forward shroud segment 304 is bolted to the second forward shroud segment 306 and the first aft shroud segment 310. Additionally or alternatively, the shroud segments 304, 306, 308, 310, 312, 314 can be inclined split such that the shroud segments are locked together. In examples disclosed herein, frictional damping between the shroud segments 304, 306, 308, 310, 312, 314 decreases movement (e.g., vibration) of the shroud segments 304, 306, 308, 310, 312, 314 during vibration mode responses.

In the illustrated example of FIG. 3, the forward shroud segments 304, 306, 308 have a first axial length 316 and the aft shroud segments 310, 312, 314 have a second axial length 318. The first axial length 316 is shorter than the second axial length 318. That is, the forward shroud segments 304, 306, 308 are not symmetric to the aft shroud segments 310, 312, 314. However, in some examples, the first axial length 316 can be longer than the second axial length 318 or equal to the second axial length 318.

FIG. 4A illustrates an example top view of a second example split shroud 400. The second split shroud 400 includes a first forward shroud segment 402, a second forward shroud segment 404, and a third forward shroud segment 406. The second split shroud 400 further includes a first aft shroud segment 408, a second aft shroud segment 410, a third aft shroud segment 412, and a fourth aft shroud segment 414. In the illustrated example of FIG. 4A, the circumferential length of the shroud segments 404, 410, 412 are equal. However, in some examples, the circumferential length of the shroud segments 402, 404, 406, 408, 410, 412, 414 are not equal.

In the illustrated example of FIG. 4A, the first forward shroud segment 402 is bolted to the second forward shroud segment 404, forming a first split line 403. The second forward shroud segment 404 is bolted to the third forward shroud segment 406, forming a second split line 405. The first aft shroud segment 408 is bolted to the second aft shroud segment 410, forming a third split line 409. The second aft shroud segment 410 is bolted to the third aft shroud segment 412, forming a fourth split line 411. The third aft shroud segment 412 is bolted to the fourth aft shroud segment 414, forming a fifth split line 413. The forward shroud segments 402, 404, 406 and the aft shroud segments 408, 410, 412, 414 form a sixth split line 415. In the illustrated example of FIG. 4A, the split lines 403, 405, 409, 411, 413 are parallel to the axial axis. That is, the split lines 403, 405, 409, 411, 413 are perpendicular to the sixth split line 415.

In the illustrated example of FIG. 4A, the forward shroud segments 402, 404, 406 have a first axial length 416, and the aft shroud segments 408, 410, 412, 414 have a second axial length 418. The first axial length 416 is equal to the second axial length 418. However, in some examples, the first axial length 416 can be longer than the second axial length 418 or shorter than the second axial length 418.

FIG. 4B illustrates an example top view of a third example split shroud 450. The third split shroud 450 includes a first forward shroud segment 452, a second forward shroud segment 454, a third forward shroud segment 456, and a fourth forward shroud segment 458. The third split shroud 450 further includes a first aft shroud segment 460, a second aft shroud segment 462, a third aft shroud segment 464, and a fourth aft shroud segment 466.

In the illustrated example of FIG. 4B, the first forward shroud segment 452 is bolted to the second forward shroud segment 454, forming a first split line 453. The second forward shroud segment 454 is bolted to the third forward shroud segment 456, forming a second split line 455. The third forward shroud 456 is bolted to the fourth forward shroud 458, forming a third split line 457. The first aft shroud segment 460 is bolted to the second aft shroud segment 462, forming a fourth split line 461. The second aft shroud segment 462 is bolted to the third aft shroud segment 464, forming a fifth split line 463. The third aft shroud segment 464 is bolted to the fourth aft shroud segment 466, forming a sixth split line 465. The forward shroud segments 452, 454, 456, 458 and the aft shroud segments 460, 462, 464, 466 form a seventh split line 467. In the illustrated example of FIG. 4A, the split lines 453, 455, 457, 461, 463, 465 are not parallel to the axial axis. That is, the split lines 453, 455, 457, 461, 463, 465 are not perpendicular to the seventh split line.

In the illustrated example of FIG. 4B, the forward shroud segments 452, 454, 456, 458 have a first axial length 468 and the aft shroud segments 460, 462, 464, 466 have a second axial length 470. The first axial length 468 is equal to the second axial length 470. However, in some examples, the first axial length 468 can be longer than the second axial length 470 or shorter than the second axial length 470.

The split shroud 300, the split shroud 400, and/or the split shroud 450 can prevent and/or reduce strain caused by engine vibration of the VSVs 202 during normal engine operation. The reduction/prevention of engine vibration increases the reliability of the VSVs 202 and the durability of the VSVs 202. The improved reliability/durability of the VSVs 202 can reduce the risk of stall due to vane locking, for example. Additionally or alternatively, the split shroud 300, the split shroud 400, and/or the split shroud 450 reduces the weight, cost, etc., of the gas turbine engine 100.

In operation, the split shroud(s) (e.g., the split shroud 300, the split shroud 400, and/or the split shroud 450) coupled to the seal box 228 provides mis-tuning and/or damping to act anti-mode to vibrations generated by the gas turbine engine 100. That is, the examples disclosed herein increase reliability/durability of gas turbine engines by decreasing vibration of the gas turbine engines (e.g., vibration of one or more airfoils, etc.). In some examples, the split shroud(s) reduce component vibration, which reduces the distortions and/or strain caused by gas turbine operation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to reduce engine vibration are disclosed herein.

Further aspects of the invention are provided by the subject matter of the following clauses. Example 1 includes a split shroud for an inner shroud of a gas turbine engine, the split shroud comprising at least one forward shroud segment, and at least one aft shroud segment to couple to the at least one forward shroud segment, the at least one forward shroud segment and the at least one aft shroud segment forming a split line.

Example 2 includes the split shroud of any preceding clause, wherein the at least one forward shroud segment and the at least one aft shroud segment are tuned to act anti-mode to engine vibration based on at least one of durability, stiffness, or weight.

Example 3 includes the split shroud of any preceding clause, wherein the at least one forward shroud segment has a first axial length and the at least one aft shroud segment has a second axial length.

Example 4 includes the split shroud of any preceding clause, wherein the first axial length is equal to the second axial length.

Example 5 includes the split shroud of any preceding clause, wherein the first axial length is longer than the second axial length.

Example 6 includes the split shroud of any preceding clause, wherein the first axial length is shorter than the second axial length.

Example 7 includes the split shroud of any preceding clause, wherein the at least one forward shroud segment is bolted to the at least one aft shroud segment.

Example 8 includes the split shroud of any preceding clause, wherein the at least one forward shroud segment and the at least one aft shroud segment form at least one opening, the at least one opening to couple the split shroud damper to an airfoil.

Example 9 includes the split shroud of any preceding clause, wherein the at least one forward shroud segment is a first forward shroud segment to couple to a second forward shroud segment and the split line is a first split line, wherein the first forward shroud segment and the second forward shroud segment form a second split line.

Example 10 includes the split shroud of any preceding clause, wherein the second split line is perpendicular to the first split line.

Example 11 includes the split shroud of any preceding clause, wherein the second split line is not perpendicular to the first split line.

Example 12 includes a gas turbine engine comprising a split shroud including at least one forward shroud segment, and at least one aft shroud segment to couple to the at least one forward shroud segment, the at least one forward shroud segment and the at least one aft shroud segment forming a split line, and a seal box coupled to the at least one forward shroud segment and the at least one aft shroud segment.

Example 13 includes the gas turbine engine of any preceding clause, wherein the at least one forward shroud segment and the at least one aft shroud segment are tuned to act anti-mode to engine vibration based on at least one of durability, stiffness, or weight.

Example 14 includes the gas turbine engine of any preceding clause, wherein the at least one forward shroud segment has a first axial length and the at least one aft shroud segment has a second axial length.

Example 15 includes the gas turbine engine of any preceding clause, wherein the first axial length is equal to the second axial length, longer than the second axial length, or shorter than the second axial length.

Example 16 includes the gas turbine engine of any preceding clause, wherein the at least one forward shroud segment is bolted to the at least one aft shroud segment.

Example 17 includes the gas turbine engine of any preceding clause, wherein the at least one forward shroud segment and the at least one aft shroud segment form at least one opening, the at least one opening to couple the split shroud damper to an airfoil.

Example 18 includes the gas turbine engine of any preceding clause, wherein the at least one forward shroud segment is a first forward shroud segment to couple to a second forward shroud segment and the split line is a first split line, wherein the first forward shroud segment and the second forward shroud segment form a second split line.

Example 19 includes the split shroud damper of any preceding clause, wherein the second split line is perpendicular to the first split line.

Example 20 includes a split shroud damper for a gas turbine engine, the split shroud damper comprising first means for mis-tuning and damping component vibration, and second means for mis-tuning and damping component vibration, the second means for mis-tuning and damping component vibration coupled to the first means for mis-tuning and damping component vibration.

The following claims are hereby incorporated into this Detailed Description by this reference, with each claim standing on its own as a separate embodiment of the present disclosure.

What is claimed is:

1. A split shroud for an inner shroud of a gas turbine engine, the split shroud comprising:
    at least a first forward shroud segment, a second forward shroud segment, and a third forward shroud segment; and
    at least one aft shroud segment to couple to the first forward shroud segment, the first forward shroud segment and the at least one aft shroud segment forming a first split line, the first forward shroud segment and the second forward shroud segment forming a second split line, the second forward shroud segment and the third forward shroud segment forming a third split line, wherein, during operation of the gas turbine engine, the first forward shroud segment vibrates at a first frequency, the second forward shroud segment vibrates at a second frequency, the third forward shroud segment vibrates at a third frequency, and the at least one aft shroud segment vibrates at a fourth frequency, wherein (1) the first frequency is different than the second frequency, the third frequency, and the fourth frequency, (2) the second frequency is different than the third frequency and the fourth frequency, and (3) the third frequency is different than the fourth frequency.

2. The split shroud of claim 1, wherein at least the first forward shroud segment, the second forward shroud segment, the third forward shroud segment and the at least one aft shroud segment are tuned to act anti-mode to engine vibration based on at least one of durability, stiffness, or weight.

3. The split shroud of claim 1, wherein the first forward shroud segment has a first axial length and the at least one aft shroud segment has a second axial length.

4. The split shroud of claim 3, wherein the first axial length is equal to the second axial length.

5. The split shroud of claim 3, wherein the first axial length is longer than the second axial length.

6. The split shroud of claim 3, wherein the first axial length is shorter than the second axial length.

7. The split shroud of claim 1, wherein the first forward shroud segment and the at least one aft shroud segment form at least one opening, the at least one opening to couple the split shroud to an airfoil.

8. The split shroud of claim 1, wherein the second split line is perpendicular to the first split line.

9. The split shroud of claim 1, wherein the second split line is not perpendicular to the first split line.

10. A gas turbine engine comprising:
    a split shroud including:
        at least a first forward shroud segment, a second forward shroud segment, and a third forward shroud segment; and
        at least one aft shroud segment to couple to the first forward shroud segment, the first forward shroud segment and the at least one aft shroud segment forming a first split line, the first forward shroud segment and the second forward shroud segment forming a second split line, the second forward shroud segment and the third forward shroud segment forming a third split line, wherein, during operation of the gas turbine engine, the first forward shroud segment vibrates at a first frequency, the second forward shroud segment vibrates at a second frequency, the third forward shroud segment vibrates at a third frequency, and the at least one aft shroud segment vibrates at a fourth frequency, wherein (1) the first frequency is different than the second frequency, the third frequency, and the fourth frequency, (2) the second frequency is different than the third frequency and the fourth frequency, and (3) the third frequency is different than the fourth frequency; and
    a seal box coupled to at least the first forward shroud segment, the second forward shroud segment, the third forward shroud segment and the at least one aft shroud segment.

11. The gas turbine engine of claim 10, wherein at least the first forward shroud segment, the second forward shroud segment, the third forward shroud segment and the at least one aft shroud segment are tuned to act anti-mode to engine vibration based on at least one of durability, stiffness, or weight.

12. The gas turbine engine of claim 10, wherein the first forward shroud segment has a first axial length and the at least one aft shroud segment has a second axial length.

13. The gas turbine engine of claim 12, wherein the first axial length is equal to the second axial length, longer than the second axial length, or shorter than the second axial length.

14. The gas turbine engine of claim 10, wherein the first forward shroud segment and the at least one aft shroud segment form at least one opening, the at least one opening to couple the split shroud to an airfoil.

15. The gas turbine engine of claim 10, wherein the second split line is perpendicular to the first split line.

* * * * *